United States Patent [19]
Starr et al.

[11] Patent Number: 5,754,140
[45] Date of Patent: May 19, 1998

[54] BEAM SHARPENED, LOW SIDELOBE ANTENNA SYSTEM

[75] Inventors: Michael A. Starr; Dale W. Jessen, both of Charlottesville, Va.; Peter J. Klotz, York, Pa.; Thomas E. Wood, Charlottesville, Va.; Jerald E. Archambault, Richfield Springs, N.Y.

[73] Assignee: Sperry Marine Inc., Charlottesville, Va.

[21] Appl. No.: 675,977

[22] Filed: Jul. 5, 1996

[51] Int. Cl.$^6$ .................. G01S 5/02; G01S 13/00
[52] U.S. Cl. .................. 342/424; 342/153; 342/427
[58] Field of Search .................. 342/380, 381, 342/424, 427, 149, 153, 373

[56] References Cited

U.S. PATENT DOCUMENTS

| | | | |
|---|---|---|---|
| 3,325,816 | 6/1967 | Dutton | 343/777 |
| 3,670,332 | 6/1972 | Bloomendaal | 342/149 |

*Primary Examiner*—Gregory C. Issing
*Attorney, Agent, or Firm*—Seymour Levine; Gerald L. Lett

[57] ABSTRACT

A beam sharpened, low sidelobe antenna is obtained by segmenting the antenna to provide two sub-antennas, one of which is arranged as an interferometer. The output signals of the two antennas are added and subtracted to provide sum and difference signals. The sum and difference signals and the output signals are then utilized to provide the desired beam sharpened, low sidelobe antenna.

20 Claims, 8 Drawing Sheets

BEAM SHARPENED, LOW SIDELOBE ANTENNA SYSTEM

BACKGROUND OF THE INVENTION

1. Field of the Invention

The invention pertains to the field of antennas and more particularly to antenna configurations and signal processing of antenna signals for beam narrowing.

2. Description of the Prior Art

Marine radar antennas are required by the International Electrotechnical Committee (IEC) specifications 936 and 872 to rotate at 20 RPM. Revisions of IEC 936 contain requirements for antennas on High Speed Craft to rotate at 40 RPM while maintaining the azimuth resolution requirements imposed on the 20 RPM antennas. The increased vessel speed and antenna rotation rate requirement, significantly increases the wind loading on the motors that rotationally drive the antenna. Mechanical solutions to this problem have been to enclose the antenna in a radome, thereby shielding it from the wind so that the load on the drive motor is that provided by the antenna alone, placing wings on the antenna to provide better aerodynamic performance, or to provide a more powerful drive motor. All these solutions add significant cost to the radar system.

It is well known that the radiation beamwidth of an antenna, which determines the angular resolution of the radar system, is a function of its size. Consequently, reducing the sail area of the antenna, while maintaining conventional antenna design and signal processing techniques, increases the radiation beamwidth, thereby adversely effecting the angular resolution of the radar system.

One technique in the prior art for decreasing the beam width of an antenna of a given size, thereby increasing the angular resolution, utilizes sum and difference signals such as those provided in a monopulse antenna system. Two antennas of equal size and configuration and having independent signal output ports, are placed side-by-side. The signals at the output ports at each half of the antenna are summed and differenced to provide sum and difference signals, the peak of the sum pattern being angular aligned with the null of the difference pattern, thus defining the boresight of the antenna. The sum is divided by the difference, which is a very low signal at boresight. Division by this low signal provides a spike at boresight. As the antenna is rotated from the target position the sum signal decreases while the difference signal increases. This respective decrease and increase of the sum and difference signals causes the ratio of the sum to difference signal pattern to decrease rapidly. Thus, the radiation pattern of the antenna is narrowed and the target position is more accurately determined.

Though processing the signal returns by dividing the sum signal by the difference signal improves target position accuracy in a single target environment, in a multiple target environment, however, this type of processing may mask true targets and give rise to ghost targets. For example, when two targets having equal radar cross sections are with in the same range bin and are positioned at equal angles on opposite sides of the boresight line, the signal at the output of the sum channel will be that of a target at the antenna's boresight having a radar cross section that is twice that of each target weighted by the level of the antenna sum pattern at the angular position of the targets. Concomitantly, the signal at the output of the difference channel will be a deep null. This results in a ratio of the sum channel output to the difference channel output that is near infinite, a strong indication of a target where there actually is no target, i.e. a ghost target indication.

Another monopulse technique utilized in the prior art for beam narrowing derives a sum and difference signal, as described above, and, instead of dividing the sum signal by the difference signal, subtracts the magnitude of difference signal from the sum signal. Since the difference signal is at a null on boresight it has little effect on the peak of the sum signal. At angles off boresight, however, the difference signal becomes significant and its subtraction from the sum signal appreciably reduces the composite signal. If the difference pattern has levels at the angular positions of the 3 dB points of the sum pattern that are equal to these 3 dB levels, the composite signal is zero at these angular positions. When these conditions are met the beam width of the composite antenna pattern is effectively one half that of the sum pattern beam width.

Monopulse subtraction processing provides a somewhat better multi-target performance than monopulse division processing. In monopulse subtraction processing, two targets within the difference beam, at equal angles on either side of the boresight line, add to provide a signal that appears to be on the boresight line. When this signal is subtracted from the sum beam signal, which is the sum of the two target signals in the sum beam, a null, which is a function of the angular position of the two targets, appears on boresight at the composite signal output. Thus, the ghost target at the boresight midway between the two targets is eliminated. When the antenna is scanned from its target balanced position, the two targets become asymmetrically positioned relative to the antenna boresight line, one providing a greater return in the sum pattern than the other. When the peak of the sum beam is at the one target position a deep null appears in the difference pattern, thus permitting the resolution of the two targets.

The composite signal output of monopulse subtraction processing, however, exhibits relatively high sidelobe levels. This is due to the fact that the level of the difference pattern lobes in the sidelobe region of the sum beam is appreciably greater than the sidelobe level of the sum beam. Consequently, subtracting the much greater signal of the difference pattern from the sidelobe of the sum pattern creates an undesirable high sidelobe level for the composite signal pattern, which may adversely effect target location determination.

SUMMARY OF THE INVENTION

It is an object of this invention to provide an antenna and signal processor which has low sidelobes and improves the target resolution and position determination accuracy over that obtainable from a conventional antenna of equal size.

In accordance with the principles of the invention, an antenna of predetermined length is divided into three sections, two sections are combined as an interferometer and the third is a continuous antenna which has a main lobe that is broader than the lobes of the interferometer. The antenna has two modes of operation, transmit and receive. In the transmit mode, the three sections are combined to form a single antenna having a radiation pattern that is determined by the illumination function, which is chosen to provide a desired sidelobe level for the transmit beam. In the receive mode, the continuous antenna section, which is illuminated by a portion of the illumination function, forms an antenna that is apart from the two sections that form the interferometer. The sections forming the interferometer are illuminated by the remainder of the illumination function. Output signals of the interferometer are added to and subtracted from the output signal of the center section. These sum and difference signals are coupled to a video filter wherein they are processed to provide a narrow beamwidth low sidelobe antenna pattern.

The invention will be more clearly understood from the following description of an embodiment thereof with reference to the accompanying drawings. It should be understood that the embodiment described is an example of the invention and other embodiments may be implemented within the purview of the invention.

DESCRIPTION OF THE PREFERRED EMBODIMENT

Figure 1:
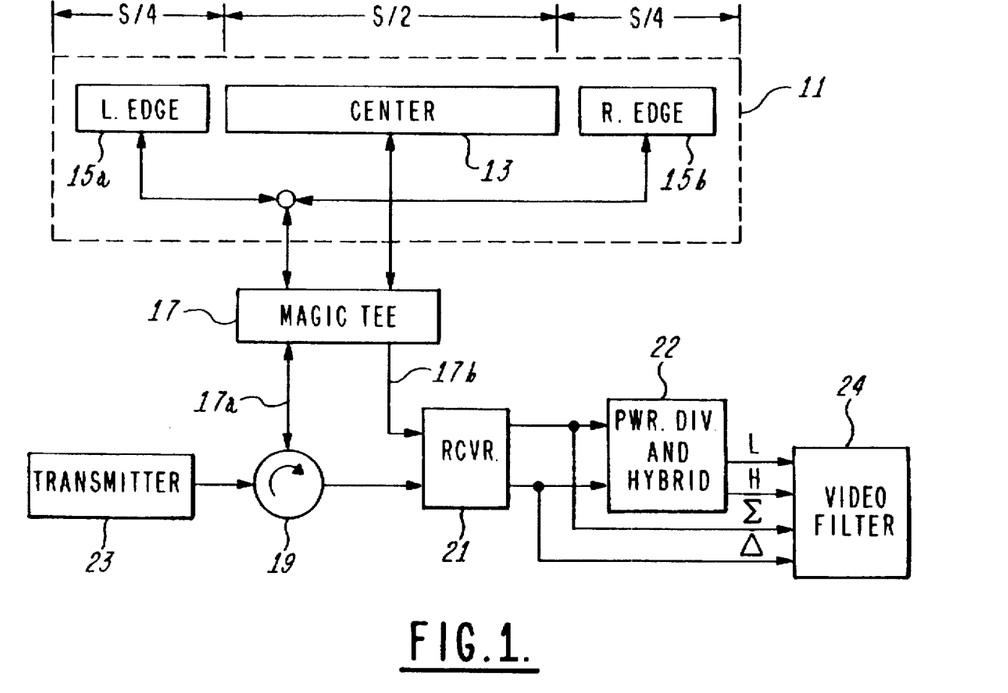
FIG. 1 is a block diagram of a preferred embodiment of the invention.

Refer now to FIG. 1. A segmented antenna system may include an antenna 11 which is of length S. The antenna 11 may be divided into three sections, a center section 13 of length S/2 and left 15a and right 15b edge sections, each of length S/4. Left edge 15a and the right edge 15b are combined in a manner to form an interferometer having a base line that is equal to 3S/4. Interferometer 15a, 15b and the center section 13 may be coupled to a magic Tee 17, or other hybrid device, which provides the sum Σ and difference Δ of the interferometer and center section signals. The sum signal output port 17a of the magic Tee 17 may be coupled via a circulator 19 to a receiver 21. The difference signal output port 17b of the magic Tee 17 may be coupled directly to the receiver 21. Since the interferometer 13a, 13b has a base line that is longer than the length of the central section 13, it produces an antenna pattern which is narrower than the antenna pattern produced by the central section. Consequently, the interferometer 15a, 15b has a higher resolution capability than the central section. Due the higher resolution capability of the interferometer 15a, 15b, in the description to follow, its output signal will be designated H, high resolution, and the central section 13 output signal will be designated L, low resolution. Signals representative of the sum Σ and difference Δ signals are coupled from the receiver 21 to a power divider and hybrid circuit 22 wherein signals representative of the high H and the low L signals are derived from H=(Σ−Δ)/2 and L=(Σ+Δ)/2. These high H and low L representative signals are coupled to a video filter 24, to which signals representative of the sum Σ and difference Δ signals are also coupled. A transmitter 23, for providing radiation signals, may be respectively coupled to the interferometer 15a, 15b and the central section 13 of the antenna 11 via the circulator 19 and the sum signal port of the magic Tee 17. Since the transmitter feeds both the central section 13 and the interferometer 15a, 15b simultaneously it provides the radiation signal for the entire antenna 11.

Figure 2:
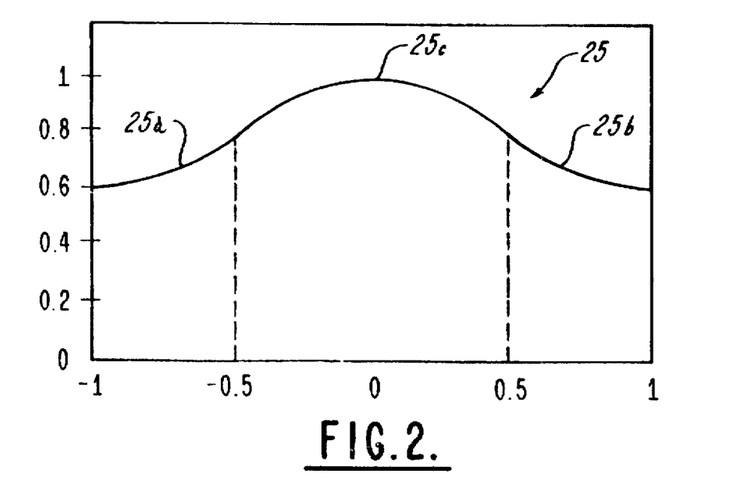
FIG. 2 a graph of an amplitude distribution which may be applied to the elements of the antenna of FIG. 1.
Figure 3A:
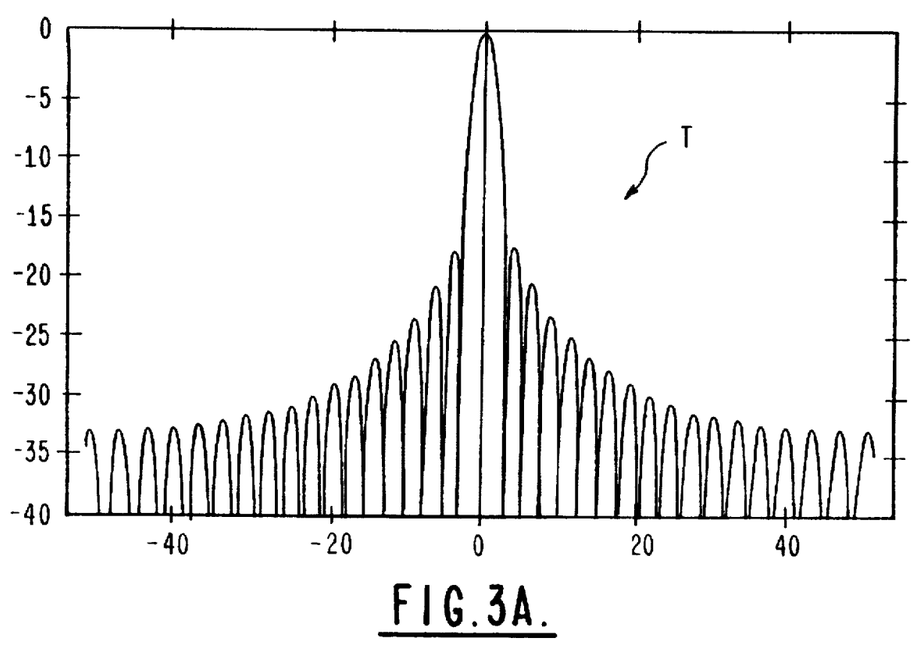
FIG. 3A is a radiation pattern for the antenna of FIG. 1 in the transmit mode when the amplitude distribution shown in FIG. 2 is applied.
Figure 3B:
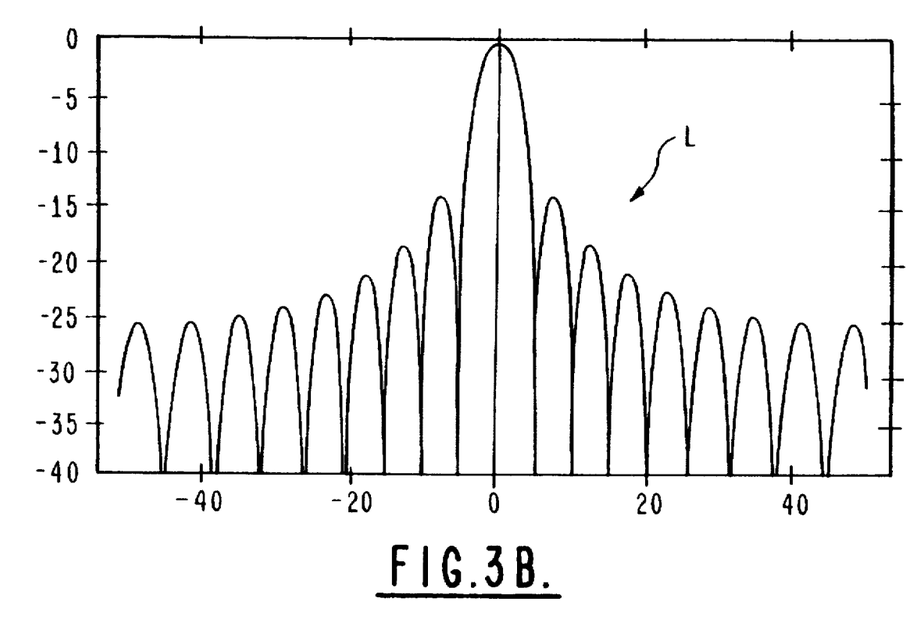
FIG. 3B is a radiation pattern of a central section of the antenna of FIG. 1 when the central section of the amplitude distribution of FIG. 2 is applied.
Figure 3C:
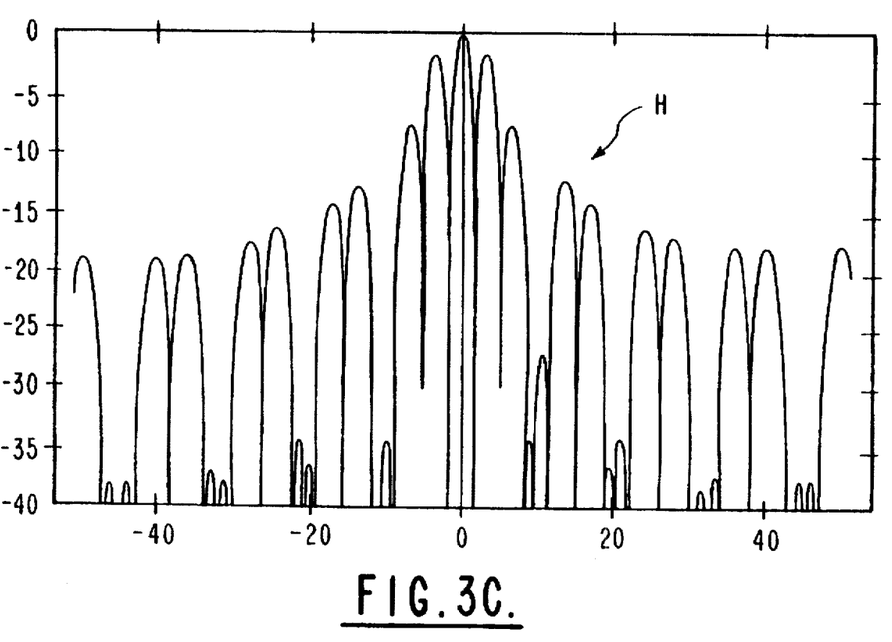
FIG. 3C is a radiation pattern of the interferometer formed by end sections of the antenna of FIG. 1 when the end sections of the amplitude distribution shown in FIG. 2 is applied.
Figure 4:
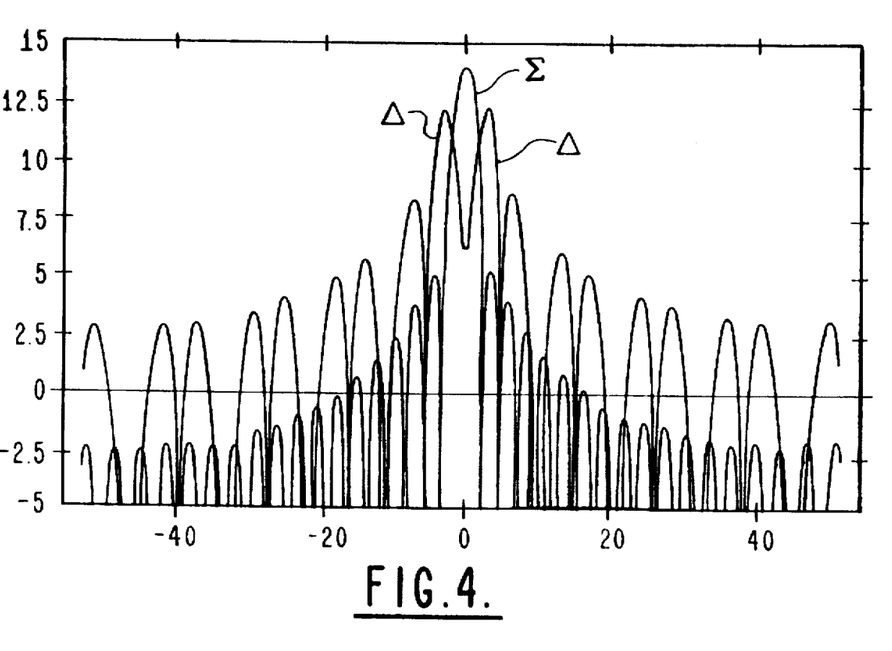
FIG. 4 shows radiation patterns established by adding the interferometer pattern of FIG. 3C to the central section pattern of FIG. 3B and by subtracting the interferometer pattern from the central section pattern.

FIG. 2 is an illustration of an antenna illumination function 25 that may be applied over the entire aperture of the antenna 11. The illustrative function 25 is a standard Taylor taper having defining parameters $\bar{n}=2$ and sidelobe level (s1)=16 dB. It should be understood that this distribution function is not limiting and that other illumination functions may be used. Since the distribution is over the entire aperture, the left 15a and right 15b edge sections have distribution functions 25a and 25b, respectively, while the central portion 13 has the distribution function 25c. For S equal to 22.5λ(λ is the operating wavelength of the antenna), the aperture distribution function of FIG. 2 gives rise to the antenna patterns shown in FIGS. 3A–3C. FIG. 3A is the transmit radiation pattern T of the entire aperture of antenna 11; FIG. 3B is the receive pattern L for the central section 13; and FIG. 3C is the receive pattern H for the interferometer 15a, 15b. The sum Σ=L+H and difference Δ=L−H patterns at the output of the magic Tee 17 are shown in FIG. 4.

Figure 5:
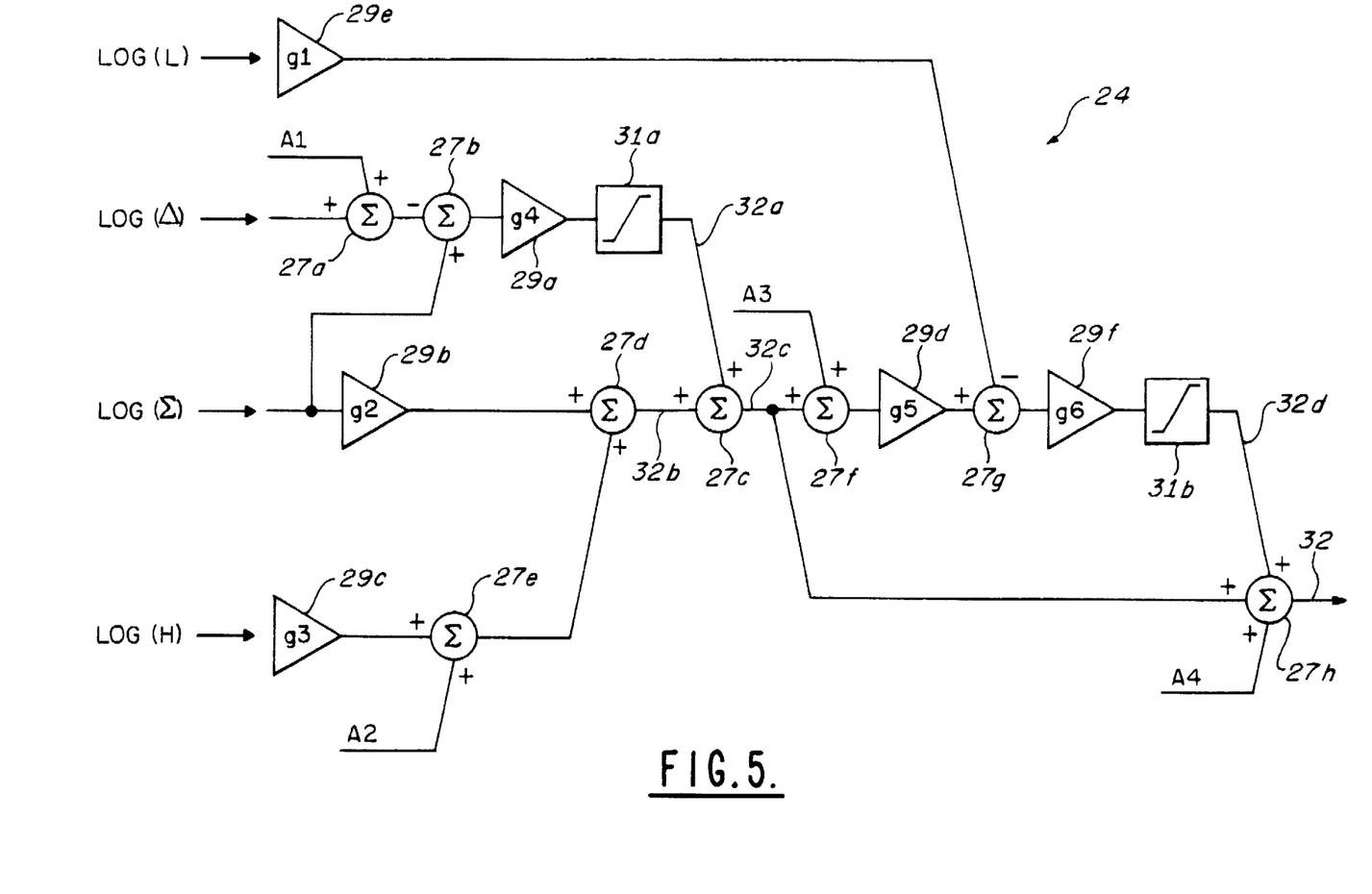
FIG. 5 is a functional block diagram of the video filter of FIG. 1.
Figure 6:
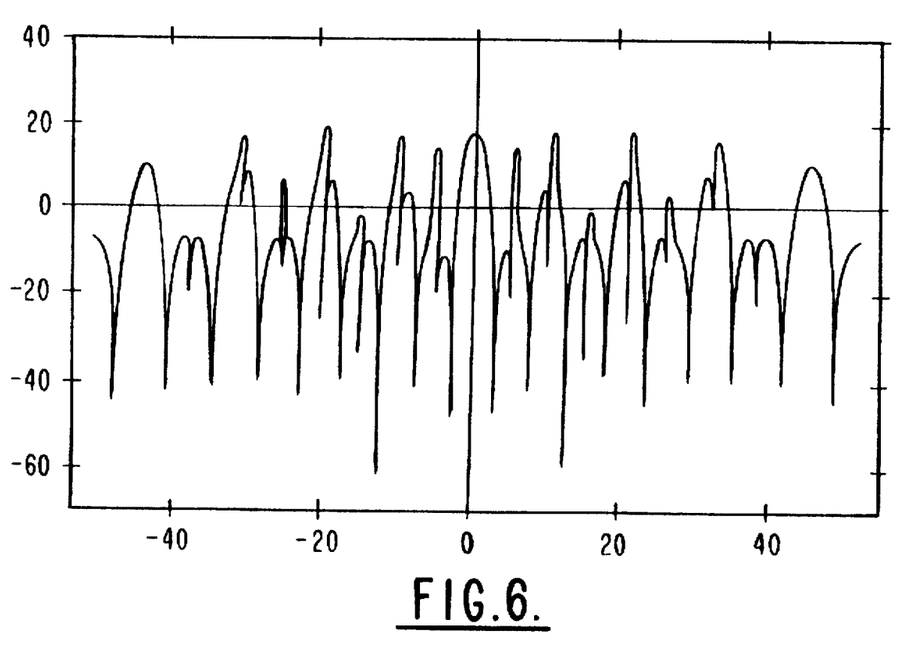
FIGS. 6–9 are patterns at various stages in the video filter of FIG. 1.

The four signals (L, H, Σ, and Δ) are coupled to the video filter 24 wherein the signals are coupled through logarithmic amplifiers to a processor such as that shown in FIG. 5. A constant $A_1$ is added to log(Δ) in summer 27a. This sum is subtracted from log(Σ) in summer 27b and the difference is multiplied by g4 in amplifier 29a. Substraction of logarithms is the equivalent of dividing the antilog of the minuend by the antilog of the subtrahend. Though the constant $A_1$ is chosen to control the sidelobe level, this division may gives rise to spikes in regions where the Δ pattern approaches zero. Spike levels may be controlled by coupling the output terminal of the amplifier 29a to a limiter 31a having an output terminal 32a at which a signal representative of $\log[\Sigma/(a_1\Delta)]^{g4}$ is provided, where $a_1$ is the antilog of $A_1$. With $A_1=0$ ($a_1=1$) and g4=1, the pattern at the output terminal 32a of limiter 31a, as a function of antenna azimuth angle from a fixed target, is given in FIG. 6.

Figure 7:
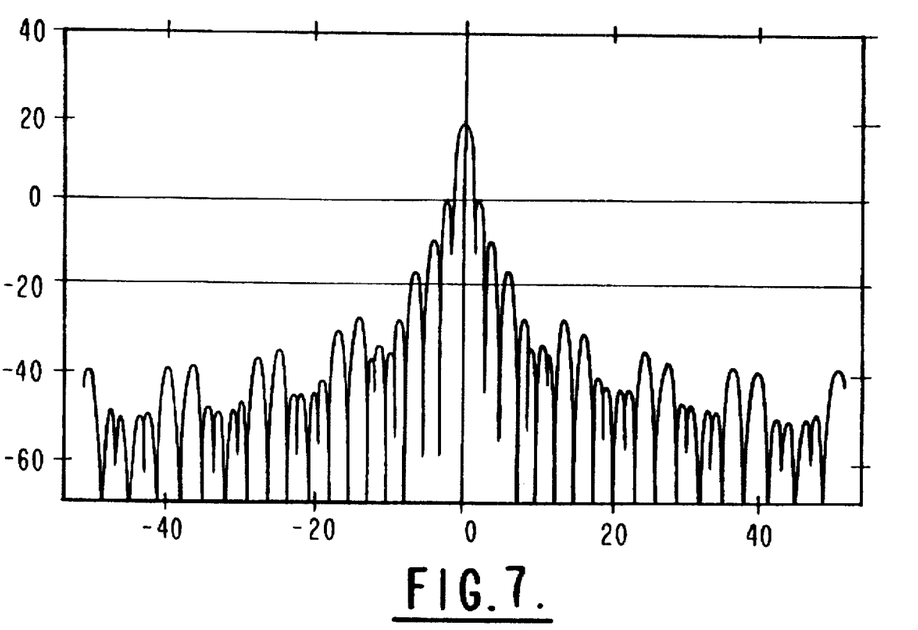
Figure 8:
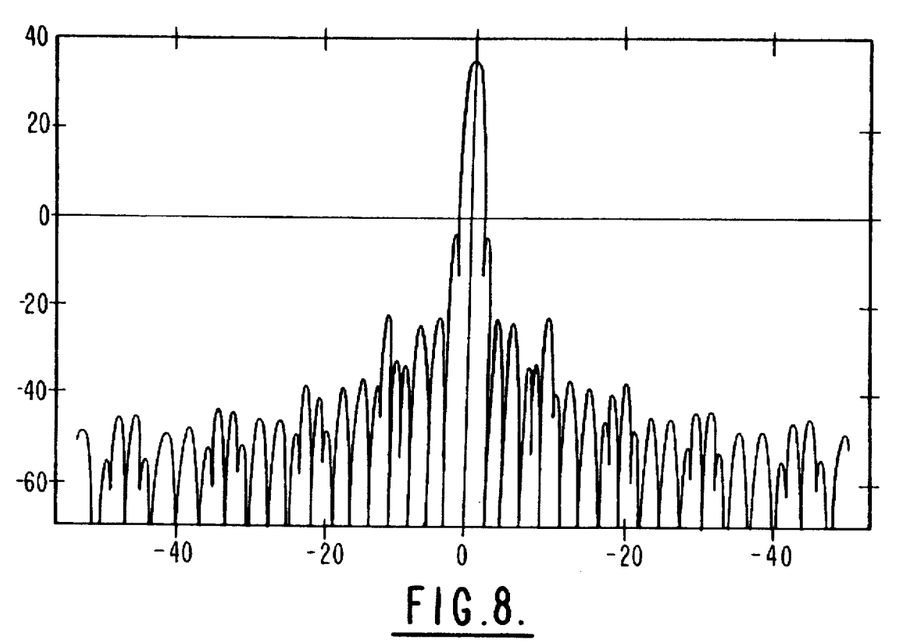

Output terminal 32a of the limiter 31a is coupled to summer 27c, wherein the signal at the output terminal 32a is added to a signal coupled to the summer 27c from the output terminal 32b of summer 27d. The signal coupled from the output terminal 32b of summer 27d is the sum of log(Σ) multiplied by g2 in amplifier 29b plus log(H) multiplied by g3 in amplifier 29c, the product being added to $A_2$ in summer 27e prior to being coupled to summer 27d. The signals at the output terminal 32b of summer 27d and the output terminal 32c of summer 27c are respectively representative of $\log(a_2\Sigma^{g2}H^{g3})$ and $\log\{a_2H^{g3}[\Sigma^{g2+g4}/9a_1\Delta)^{g4}]\}$, where $a_2$ is the antilog of $A_2$. Patterns at the terminals 32b and 32c, when $A_2=−18$, g2=0.5, and g3=0.5, are respectively shown in FIGS. 7 and 8.

Output terminal 32c of summer 27c is coupled to summer 27f wherein a constant A3 is added. The signal at the output terminal of summer 27f is multiplied by g5 in amplifier 29d and coupled to summer 27g wherein Log(L), multiplied by g1 in amplifier 29e, is subtracted therefrom. The difference signal at the output terminal of summer 27g is multiplied by g6 in amplifier 29f and coupled to limiter 31b having an output terminal 32d at which a signal is provided which is representative of $$log\{[(a_2a_3)^{g5g6}/a_1^{g4g5g6}](H^{g3g5g6}/L^{g1g6})[\Sigma^{(g2+g4)g5g6}/\Delta^{g4g5g6}]\}.$$

Figure 9:
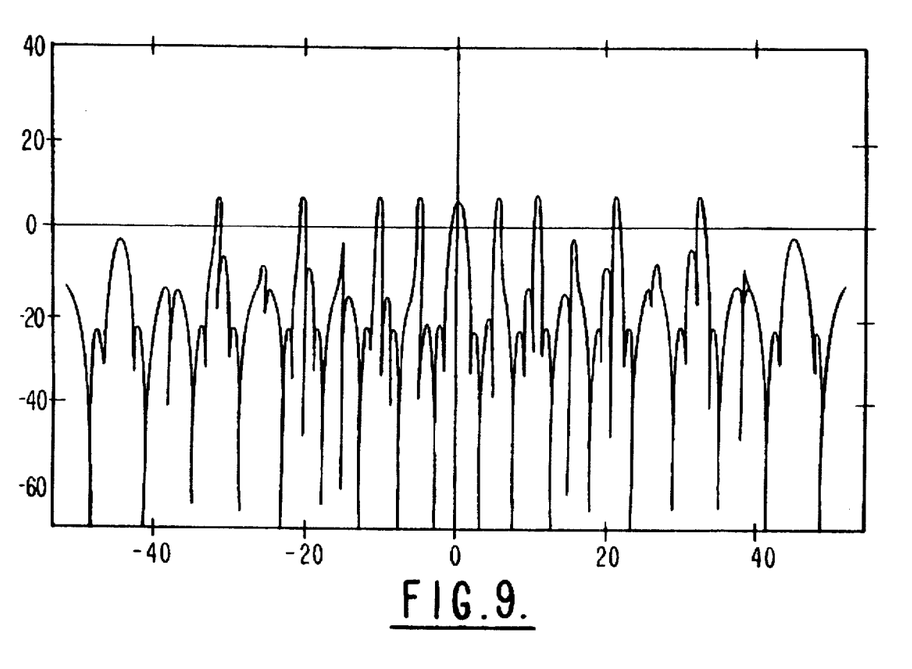

A pattern for this signal is given in FIG. 9, when $A_1=0$, $A_2=-18$, $g2=g3=0.5$, $g4=g5=g6=1$.

The output terminal 32d of limiter 31b is coupled to summer 27h to which the output terminal 32c of summer 27c and a constant $A_4$ are also coupled. The three signals coupled to summer 27h are added to provide a signal at the output terminal 32e which is representative of $$log\ [C(H^{n1}/L^{n2})(\Sigma^{n3}/\Delta^{n4})].$$

Figure 10:
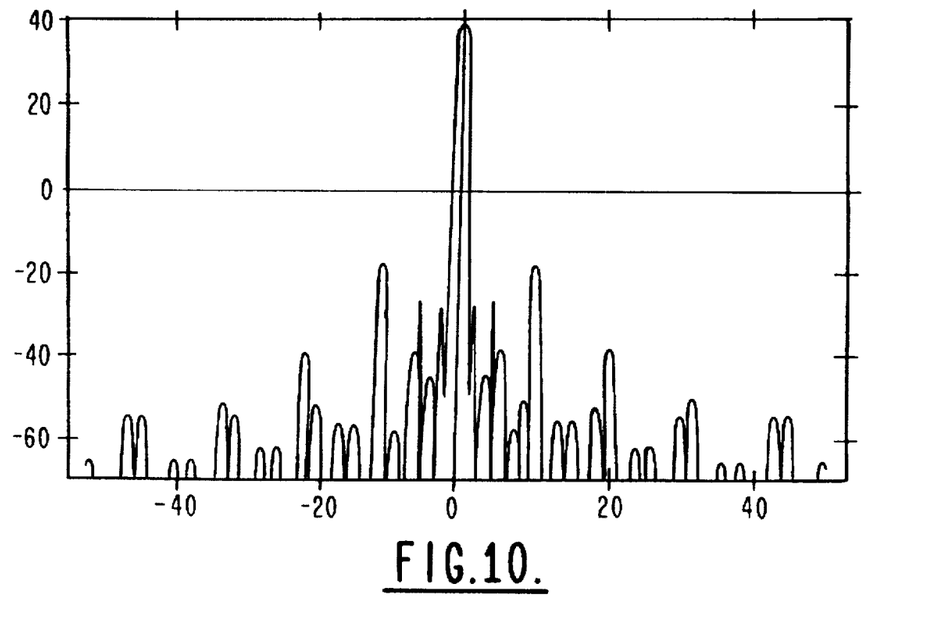
FIG. 10 is a radiation pattern of the antenna system provided at the video filter output terminal.

Thus the sharpened antenna pattern is given by:

$$C(H^{n1}/L^{n2})(\Sigma^{n3}/\Delta^{n4})$$

where:
$C=(a_2a_3)^{g5g6}a_2a_4/a_1^{g4(1+g5g6)}$
$n1=g3(1+g5g6)$
$n2=g1g6$
$n3=(g2+g4)(1+g5g6)$
$n4=g4(1+g5g6)$ The output pattern of the video filter, the desired antenna pattern, when $A_1=A_4=0$, $A2=-18$, $A3=6$, $g1=g4=g5=g6=1$, and $g2=g3=0.5$ is shown in FIG. 10. The beamwidth of the antenna pattern is approximately 1.40.

Figure 11:
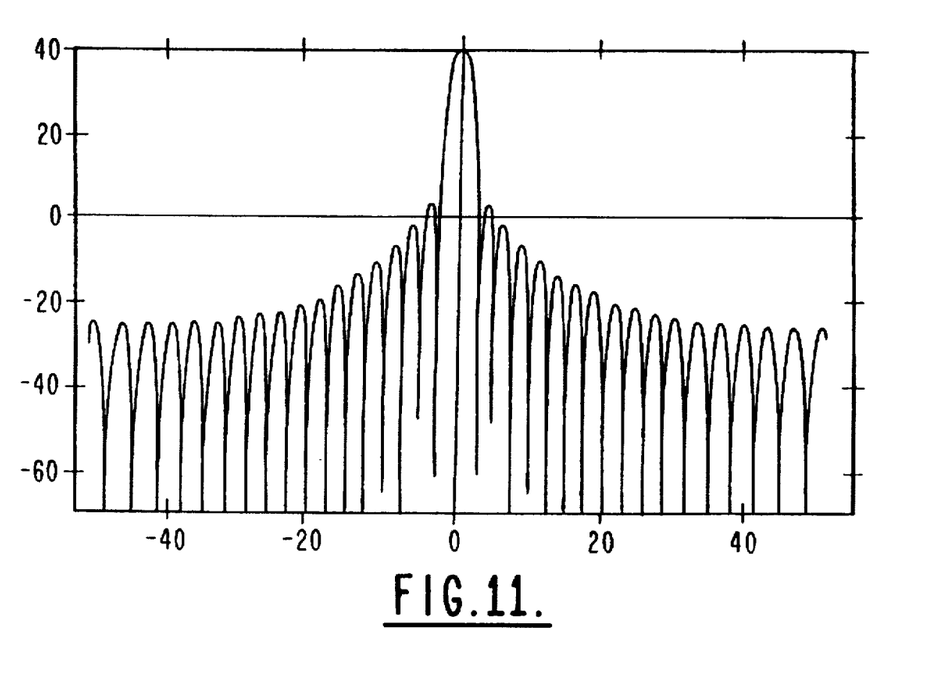
FIG. 11 is a two way radiation pattern of the central and end sections of FIG. 1 operating as a continuous antenna.

All of the above patterns are two way patterns, i.e. they are the result of transmitting the pattern shown in FIG. 3A and processing the received L and H patterns of FIGS. 3B and 3C, respectively. As stated above, the antenna has an overall length of 22.5λ and a Taylor distribution with $\bar{n}=2$ and $s1=16$ dB over the entire antenna. A conventional antenna having a length of 22.5λ and a Taylor distribution with $\bar{n}=2$ and $s1=16$ dB will have an antenna pattern as shown in FIG. 11. It is apparent from these Figures that a significant reduction in the beamwidth and sidelobe levels has been achieved with the segmented antenna and the video filter.

Figure 12:
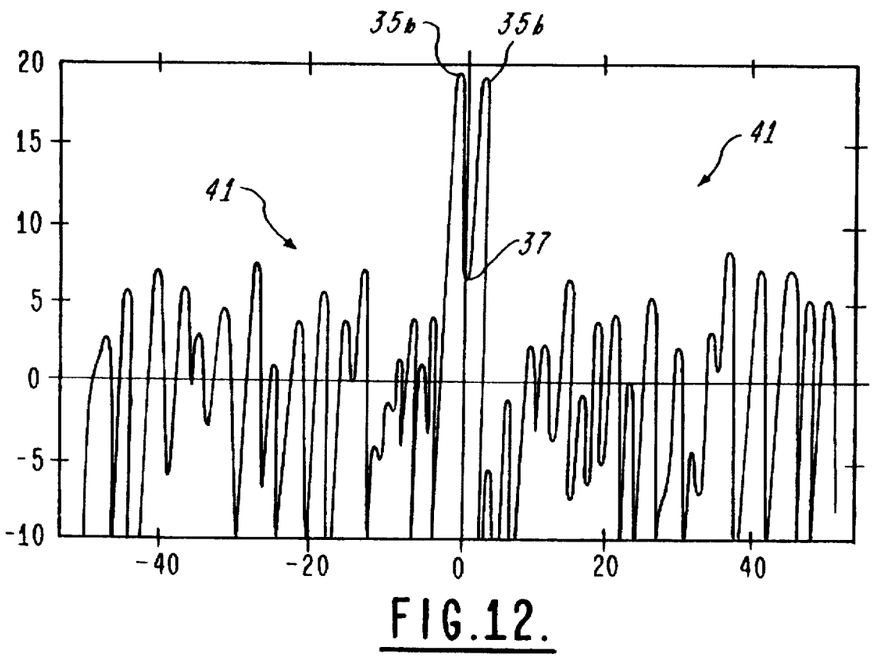
FIG. 12 is a two way radiation pattern at the video filter output terminals for a two target operating environment.

The above discussion has considered but one target. In a multiple target environment the beam narrowing realized with the segmented antenna 11 and the signal processing performed by the video filter 24 provides significant improvements in target resolution over that achievable with a conventional antenna of equal size without generating ghost targets. A two way pattern generated by the segmented antenna 11 and video filter 24 combination is shown in FIG. 12. The targets are of equal radar cross-section, are at equal ranges, and are in Rayleigh distributed noise with an angular separation of 2.50. The video filter processing parameters for the pattern of FIG. 12 are: $A_1=8$; $A_2=1$; $A_3=A_4=0$; $g1=g4=g5=g6=1$; $g2=g3=0.5$. Two discernible pattern peaks 35a and 35b, respectively representing target detections, are clearly indicated in FIG. 12. These pattern peaks are separated by 2.50 and positioned 1.250 on either side of a deep null 37, no ghost targets are discernible. A conventional antenna having a length equal to the length of the segmented antenna 11 and a Taylor aperture taper with $\bar{n}=2$ and $s1=16$ dB would have a beam width of approximately 2.80. This conventional antenna would not be able to resolve two targets with 2.50 of angular separation.

Figure 13:
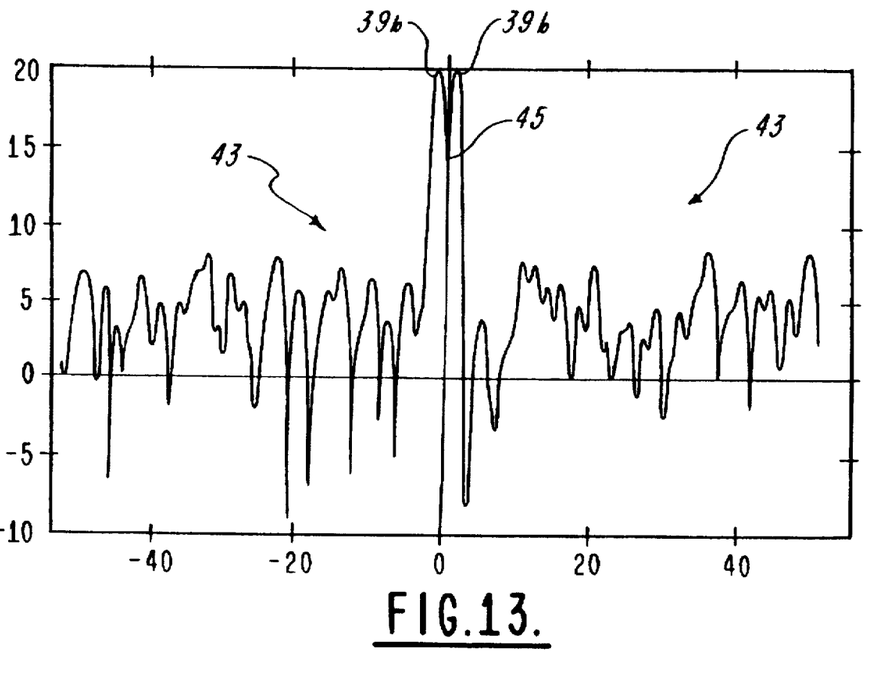
FIG. 13 is a two way radiation pattern of a conventional antenna for a two target operating environment.

A comparison of the two target pattern generated by the segmented antenna 11 with the video filter 24 processor to a two target pattern, shown in FIG. 13, generated by a conventional antenna having a length twice that of the segmented antenna, indicates the superior performance of the segmented antenna system. The target indication peaks 35a and 35b in FIG. 12 are substantially at the same angular positions as the target indication peaks 39a and 39b in FIG. 13. The sidelobes 41 in FIG. 12 have substantially the same peak levels as the sidelobes 43 in FIG. 13. The null depth 37 between targets in FIG. 12, however, is substantially greater than the null depth 45 between targets for the conventional antenna pattern of FIG. 13.

While only certain embodiments of the invention have been described, it will be apparent to those skilled in the art that various changes and modifications may be made within the purview of the appended claims without departing from the true scope and spirit of the invention in its broader aspects.

We claim:

1. An antenna system comprising:
   an antenna segmented and arranged to provide a first received signal at a first port and a second received signal at a second port, said second port coupled to segments of said antenna in a manner to establish an interferometer;

hybrid means coupled to said first and second ports for adding said first received signal to said second received signal and for subtracting said first received signal from said second received signal, thereby forming sum and difference signals, respectively; and processing means coupled to receive said sum signal and said difference signal for processing said sum and difference signals in a manner to provide antenna beam sharpened signals.

2. An antenna system in accordance with claim 1 wherein said antenna is segmented in a manner to provide a central section and two end sections, said two end sections coupled to said second port to form said interferometer.

3. An antenna system in accordance claim 2 wherein said antenna is of length S, said central section is of length S/2, and each end section is of length S/4.

4. An antenna system in accordance claim 2 wherein said processing means includes:
   means for extracting said first and second signals from said sum and difference signals; and
   filter means coupled to receive said first and second signals and said sum and difference signals for providing said antenna beam sharpened signals.

5. An antenna system in accordance claim 4 wherein said filter means includes:
   logarithmic amplifier means coupled to receive said first and second signals and said sum and difference signals for providing first and second log signals representative of logarithms of said first and second signals, respectively, and sum and difference log signals representative of logarithms of said sum and difference signals, respectively;
   first sum means coupled to receive said sum and difference log signals and said second log signals for providing first addition signals representative of additions of said second log signals to signals representative of subtractions of said difference log signals from said sum log signals;

second sum means coupled to receive said first addition signals and said first log signals for providing second addition signals representative of said first log signals subtracted from said first addition log signals; and third sum means coupled to said first and second sum means for providing signals representative of additions of said first and second addition signals, thereby providing said antenna beam sharpened signals.

6. An antenna system in accordance claim 5 wherein said first sum means include first amplifier means for respectively multiplying said second log signals, said sum log signals, said difference log signals, and said first addition signals and wherein said second sum means includes second amplifier means for respectively, multiplying said first log signals and said second addition signals.

7. An antenna system in accordance claim 6 wherein said first sum means includes means for respectively adding constants to said second log signals and to said difference log signals, said second sum means includes means for adding a constant to said first addition signals, and said third sum means includes means for adding a constant to said additions of said first and second addition signals.

8. An antenna system in accordance claim 1 wherein said processing means includes:

means for extracting said first and second signals from said sum and difference signals; and filter means coupled to receive said first and second signals and said sum and difference signals for providing said antenna beam sharpened signals.

9. An antenna system in accordance claim 8 wherein said filter means includes:

logarithmic amplifier means coupled to receive said first and second signals and said sum and difference signals for providing first and second log signals representative of logarithms of said first and second signals, respectively, and sum and difference log signals representative of logarithms of said sum and difference signals, respectively;

first sum means coupled to receive said sum and difference log signals and said second log signals for providing first addition signals representative of additions of said second log signals to signals representative of subtractions of said difference log signals from said sum log signals;

second sum means coupled to receive said first addition signals and said first log signals for providing second addition signals representative of said first log signals subtracted from said first addition log signals; and third sum means coupled to said first and second sum means for providing signals representative of additions of said first and second addition signals, thereby providing said antenna beam sharpened signals.

10. An antenna system in accordance claim 9 wherein said first sum means include first amplifier means for respectively multiplying said second log signals, said sum log signals, said difference log signals, and said first addition signals and wherein said second sum means includes second amplifier means for respectively, multiplying said first log signals and said second addition signals.

11. An antenna system in accordance claim 10 wherein said first sum means includes means for respectively adding constants to said second log signals and to said difference log signals, said second sum means includes means for adding a constant to said first addition signals, and said third sum means includes means for adding a constant to said additions of said first and second addition signals.

12. An antenna in accordance with claim 3 further including means coupled to said hybrid means and said processing means for coupling a transmitter to said first and second ports in a manner to provide radiation from an antenna of length S.

13. A method for narrowing the beam of an antenna of predetermined size comprising the steps of:

segmenting said antenna to establish first and second sub-antennas, said second sub-antenna arranged to form an interferometer;

coupling said first and second sub-antennas to provide signals representative of sum and difference of first and second signals at output ports of said first and second sub-antennas, respectively; and processing said sum and difference representative signals in a manner to provide a beam narrowed signal.

14. A method in accordance with claim 13 wherein said processing step includes the steps of:

extracting said first and second signals from said sum and difference representative signals;

coupling said first and second signals and said sum and difference representative signals to logarithmic amplifiers to obtain first and second log signals and sum and difference log signals;

subtracting said log difference signal from said sum log signal to provide a subtraction log signal;

adding said second log signal to said sum log signal to provide a sub-addition signal;

adding said sub-addition signal to said subtraction log signal to provide a first addition signal;

subtracting said first log signal from said first addition signal to provide a second addition signal; and adding said first and second addition signals to provide antenna beam narrowed signal.

15. A method in accordance with claim 14 further includes the steps of:

multiplying said subtraction log signal by a first predetermined multiplicative constant;

multiplying said sum log signal and said second log signal by second and third multiplicative constants, respectively;

multiplying said first log signal and said first addition signal by fourth and fifth predetermined multiplicative constants, respectively; and multiplying said second addition signal by a sixth predetermined constant.

16. A method in accordance with claim 15 further including the steps of adding preselected constants to said log difference signal, said second signal, said first addition signal, and to said beam narrowed signal, respectively.

17. A method in accordance with claim 13 wherein said antenna is of length S, said first sub-antenna is of length S/2 and is a central section of said antenna and said second sub-antenna comprises two end sections of said antenna, each of length S/4.

18. A method in accordance with claim 17 further including the step of coupling said central and said two end sections in a manner to provide an antenna with a radiating aperture of length S.

19. A method in accordance with claim 13 wherein said processing step includes the steps of:

adding said sum and difference representative signals to obtain said first signal; and subtracting said difference signal from said sum signal to obtain said second signal.

20. A method in accordance with claim 18 wherein said processing step further includes the steps of:

passing said first and second signals and said sum and difference representative signals through logarithmic amplifiers to respectively obtain first and second log signals and sum and difference log signals;

utilizing said first and second log signals and said sum and difference log signals to provide said beam narrowed.

* * * * *